United States Patent
Roh et al.

(10) Patent No.: US 9,161,155 B2
(45) Date of Patent: Oct. 13, 2015

(54) METHODS, SYSTEM AND APPARATUS FOR SHARING AND USING LOCATION INFORMATION IN PORTABLE TERMINAL

(75) Inventors: Dong-Hyun Roh, Gyeonggi-do (KR); Moon-Bae Song, Seoul (KR); Sang-Mi Kim, Seoul (KR); Hyun-Mi Kwak, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 406 days.

(21) Appl. No.: 13/450,993

(22) Filed: Apr. 19, 2012

(65) Prior Publication Data

US 2012/0270568 A1     Oct. 25, 2012

(30) Foreign Application Priority Data

Apr. 19, 2011 (KR) .................. 10-2011-0036447

(51) Int. Cl.
*H04W 4/00* (2009.01)
*H04W 4/02* (2009.01)

(52) U.S. Cl.
CPC .............. *H04W 4/003* (2013.01); *H04W 4/02* (2013.01)

(58) Field of Classification Search
CPC ....... H04W 64/00; H04W 4/003; H04W 4/02; H04W 4/06
USPC ................. 455/456.1–457, 418–419, 432.3
See application file for complete search history.

(56) References Cited

U.S. PATENT DOCUMENTS

| | | | | |
|---|---|---|---|---|
| 8,392,500 | B2 * | 3/2013 | Macwan | 709/203 |
| 2006/0223518 | A1 * | 10/2006 | Haney | 455/420 |
| 2008/0299989 | A1 | 12/2008 | King et al. | |
| 2009/0325603 | A1 | 12/2009 | Van Os et al. | |
| 2010/0024045 | A1 | 1/2010 | Sastry et al. | |
| 2010/0251340 | A1 | 9/2010 | Martin et al. | |
| 2010/0279713 | A1 | 11/2010 | Dicke | |
| 2010/0299060 | A1 | 11/2010 | Snavely et al. | |
| 2012/0009897 | A1 * | 1/2012 | Kasad et al. | 455/411 |

OTHER PUBLICATIONS

Janice Y. Tsai et al., "Location-Sharing Technologies: Privacy Risks and Controls", XP-55033752, Feb. 1, 2010.

* cited by examiner

*Primary Examiner* — Marcos Torres
(74) *Attorney, Agent, or Firm* — The Farrell Law Firm, P.C.

(57) ABSTRACT

Methods, apparatus and a system are provided for sharing and using location information in a portable terminal. A setting indicating whether location-information sharing is activated is received for each application of the portable terminal that uses location information. The settings are transmitted to a server. An application for which location-information sharing is activated is executed. A request for sharing of location information with respect to the executed application is transmitted to the server. Location information of a portable terminal in which location-information sharing is activated for the executed application is received from the server. The received location information is processed through the executed application.

16 Claims, 4 Drawing Sheets

| FIRST SET VALUE | |
|---|---|
| App A | ON |
| App B | OFF |
| App C | OFF |
| App D | ON |
| ⋮ | |

310

| SECOND SET VALUE | |
|---|---|
| App A | OFF |
| App B | OFF |
| App C | OFF |
| App D | ON |
| ⋮ | |

320

| THIRD SET VALUE | |
|---|---|
| App A | ON |
| App B | ON |
| App C | OFF |
| App D | OFF |
| ⋮ | |

330

| FOURTH SET VALUE | |
|---|---|
| App A | OFF |
| App B | ON |
| App C | ON |
| App D | ON |
| ⋮ | |

METHODS, SYSTEM AND APPARATUS FOR SHARING AND USING LOCATION INFORMATION IN PORTABLE TERMINAL

PRIORITY

This application claims priority under 35 U.S.C. §119(a) to a Korean Patent Application filed in the Korean Intellectual Property Office on Apr. 19, 2011 and assigned Serial No. 10-2011-0036447, the entire disclosure of which is incorporated herein by reference.

BACKGROUND OF THE INVENTION

1. Field of the Invention

The present invention relates generally to the use of location information in a portable terminal, and more particularly, to the sharing of location information between portable terminals and the use of the shared location information.

2. Description of the Related Art

Portable terminals, such as, for example, smart phones and tablets, include applications that provide various useful functions for users.

In particular, recently developed portable terminals provide, for example, a Location Based Service (LBS) function that uses a Global Positioning System (GPS) module, or the like.

There are currently various applications that utilize location information. A user may install a desired application in a portable terminal, and location information may be used through the installed application.

When several applications that use location information are already installed in the portable terminal, the user may set whether the individual applications are permitted to use the location information. Specifically, conventional techniques allow for the separate setting of permission to use location information on application-by-application basis.

SUMMARY OF THE INVENTION

The present invention has been made to address at least the above problems and/or disadvantages and to provide at lest the advantages described below. Accordingly, an aspect of the present invention provides the sharing of location information of a portable terminal and the use of the shared location information.

According to an aspect of the present invention, a method is provided for sharing and using location information in a portable terminal. A setting indicating whether location-information sharing is activated is received for each application of the portable terminal that uses location information. The settings are transmitted to a server. An application for which location-information sharing is activated is executed. A request for sharing of location information with respect to the executed application is transmitted to the server. Location information of a portable terminal in which location-information sharing is activated for the executed application is received from the server. The received location information is processed through the executed application.

According to another aspect of the present invention, a system is provided for sharing and using location information in a portable terminal. The system includes a portable terminal for receiving, for each application of portable terminal, a corresponding setting indicating whether location-information sharing is activated, and transmitting the settings to a server. The system also includes a server for, when the portable terminal requests sharing of location information after executing an application, transmitting location information of a portable terminal in which location-information sharing is activated for the executed application to the portable terminal.

According to an additional aspect of the present invention, a method is provided for sharing location information in a server. The server receives, from a plurality of portable terminals, settings indicating whether location-information sharing is activated for each application of the plurality of portable terminals that uses location information. A request is received for sharing of location information from a first portable terminal of the plurality of portable terminals in which an application for which location-information sharing is activated is executed. It is determined whether location-information sharing is activated for the application in any of the plurality of portable terminals. When location-information sharing is activated for the application in a second portable terminal of the plurality of portable terminals, location information of the second portable terminal is transmitted to the first portable terminal.

According to a further aspect of the present invention, a portable terminal is provided for sharing and using location information. The portable terminal includes an input unit for receiving, for each application of the portable terminal that uses location information, a corresponding setting indicating whether location-information sharing is activated. The portable terminal also includes a transceiver for transmitting, to a server, the settings and a request for sharing of location information with respect to an executed application in which location information sharing is activated, and receiving location information of a portable terminal in which location-information is activated for the executed application. The portable terminal further includes a controller for executing the application, and processing the received location information through the executed application.

Additionally, according to another aspect of the present invention, a server is provided for sharing location information. The server includes a receiver for receiving, from a plurality of portable terminals, settings indicating whether location-information sharing is activated for each application of the plurality of portable terminals that uses location information, and receiving a request for sharing of location information from a first portable terminal of the plurality of portable terminals in which an application for which location-information sharing is activated is executed. The server also includes a controller for determining whether location-information sharing is activated for the application in any of the plurality of portable terminals. The server further includes a transmitter for transmitting location information of a second portable terminal of the plurality of portable terminals to the first portable terminal, when location-information sharing is activated for the application in the second portable terminal.

According to another aspect of the present invention, an article of manufacture is provided for sharing and using location information in a portable terminal. The article of manufacture includes a machine readable medium containing one or more programs which when executed implement the steps of: receiving, for each application of the portable terminal that uses location information, a corresponding setting indicating whether location-information sharing is activated; transmitting the settings to a server; executing an application for which location-information sharing is activated; transmitting a request for sharing of location information to the server with respect to the executed application; receiving, from the server, location information of a portable terminal in which location-information sharing is activated for the executed application; and processing the received location information through the executed application.

BRIEF DESCRIPTION OF THE DRAWINGS

The above and other aspects, features and advantages of the present invention will be more apparent from the following detailed description when taken in conjunction with the accompanying drawings, in which:

FIG. 3 is a diagram illustrating a process of sharing location information, according to an embodiment of the present invention.

DETAILED DESCRIPTION OF EMBODIMENTS OF THE PRESENT INVENTION

Figure 1:
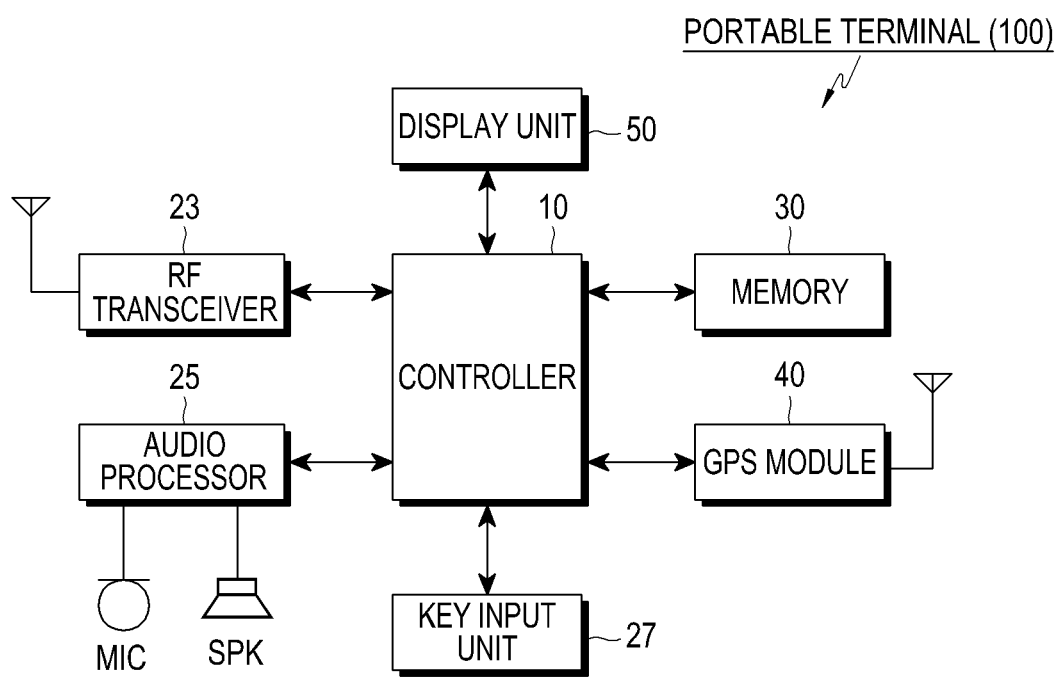
FIG. 1 is a block diagram illustrating a portable terminal, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

In accordance with an embodiment of the present invention, a portable terminal is a mobile electronic apparatus that is easy to carry, including, for example, a video phone, a portable phone, a smart phone, an International Mobile Telecommunication (IMT)-2000 terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) device, an Electronic(E)-book, a portable computer (a notebook, a tablet, etc.), and a digital camera.

Referring initially to FIG. 1, a block diagram illustrates a portable terminal 100, according to an embodiment of the present invention. The portable terminal includes a Radio Frequency (RF) transceiver 23, an audio processor 25, a key input unit 27, a memory 30, a GPS module 40, a display unit 50, and a controller 50.

The RF transceiver 23 includes an RF unit and a modem. The RF unit includes an RF transmitter for up-converting a frequency of a transmission signal and amplifying the up-converted transmission signal. The RF unit also includes an RF receiver for low-noise-amplifying a received signal and down-converting a frequency of the low-noise-amplified signal. The modem includes a transmitter for encoding and modulating the transmission signal, and a receiver for demodulating and decoding the received signal.

The audio processor 25 constitutes a codec including a data codec and an audio codec. The data codec processes packet data and the audio codec processes audio signals, such as, for example, voice and a multimedia files. The audio processor 25 also converts a digital audio signal received from the modem into an analog audio signal through the audio codec and reproduces the analog audio signal. The audio processor 25 also converts an analog audio signal generated from a microphone (MIC) into a digital audio signal through the audio codec and transmits the digital audio signal to the modem. The codec may be separately provided or may be included in the controller 10.

The key input unit 27 includes keys for inputting numeric and character information, and function keys or a touch pad for setting various functions. When the display unit 50 is implemented with a touch screen of, for example, a capacitive or resistive type, the key input unit 27 includes only preset minimum keys, such that the display unit 50 may replace a part of the key input function of the key input unit 27.

According to an embodiment of the present invention, the key input unit 27 provides functions of executing an application that uses location information and requesting the sharing of location information in the executed application.

The memory 30 includes program and data memories. The program memory stores programs for controlling a general operation of the portable terminal. The memory 30 may include an external memory, such as, for example, a Compact Flash (CF), a Secure Digital (SD), a Micro Secure Digital (Micro-SD), a Mini-SD, an Extreme Digital (xD), a memory stick, or the like. The memory 30 may also include a disk, such as, for example, a Hard Disk Drive (HDD) or a Solid State Disk (SSD).

According to an embodiment of the present invention, the memory 30 stores a set value regarding the sharing of location information of the portable terminal. Once a predetermined application, which provides a Location Based Service (LBS) function via the location information of the portable terminal, is installed, the user is provided with a menu for setting whether use of the location information of the portable terminal is permitted for each installed application. For example, for several applications using location information, the user may set whether use of location information of the portable terminal is permitted for each application, and the setting is stored as a set value in the memory 30.

When a predetermined application for which permission to use and share location information is set is deleted, a set value is updated by deleting a setting corresponding to the removed application from the set value, and the updated set value is stored in the memory 30. When the set value is changed (e.g., updated), the changed set value is promptly transmitted to a server within a predetermined time.

The GPS module 40 receives a GPS signal for the acquisition of a longitudinal value and a latitudinal value corresponding to a current location of the portable terminal. These values provide location information regarding the current location of the portable terminal. The GPS module 40 may be replaced or used together with a separate hardware or software module capable of providing location information of the portable terminal. In an embodiment of the present invention, the function of providing the location information by the GPS module 40 may be replaced or be used together with a positioning function that uses a triangulation based on an interworking between the RF transceiver 23 and base stations.

The display unit 50 includes a Liquid Crystal Display (LCD), or an Organic Light Emitting Diode (OLED), such as, for example, a Passive Matrix OLED (PMOLED) or an Active Matrix OLED (AMOLED). The display unit 50 outputs display information that is generated in the portable terminal. The display unit 50 may be embodied as a touch screen of a capacitive or resistive type, and may operate as an input unit for controlling the portable terminal, together with the key input unit 27.

According to an embodiment of the present invention, the display unit 50 may provide the key input function of executing an application that uses location information via the touch screen. The display unit 50, having the touch screen, may also request the sharing of location information in the executed application.

The controller 10 controls the overall operation of the portable terminal 100, according to an embodiment of the present invention, and switches and controls the operation of the portable terminal according to user input generated through the key input unit 27 or the display unit 50. According to an embodiment of the present invention, the controller 10 receives a setting of whether to share location information for each application that uses the location information. The controller 10 stores the settings as a set value, and transmits the stored set value to the server. The controller 10 requests that the server share location information after execution of a predetermined application. The controller 10 also receives the location information of another portable terminal, for which sharing is activated in association with the executed application, from the server, which has checked the set values of portable terminals. The controller 10 processes the received location information through the executed application.

Devices, such as a Bluetooth module, a WiFi module, an acceleration sensor, a proximity sensor, a geo-magnetic sensor, a Digital Media Broadcasting (DMB) receiver, may also be included in the portable terminal to provide corresponding functions.

For example, the acceleration sensor senses a motion state of the portable terminal by measuring a dynamic force such as acceleration, vibration, shock, or the like. The acceleration sensor also senses a display direction of the display unit of the portable terminal through the sensed motion state.

The proximity sensor senses a proximity of a part of a user's body to the portable terminal, thereby preventing malfunction of the portable terminal.

The gyroscope observes dynamic motion of the rotating portable terminal and senses a rotating motion along six axes of the portable terminal, specifically, up or down, left or right, forward or backward, an X axis, a Y axis, and a Z axis, in association with the acceleration sensor.

A camera module that allows the user to capture a (still or moving) image may also be included in the portable terminal, such that location information acquired by the GPS module 40 at the time of capturing may be inserted into a captured image to allow the user to know later the location where the image is captured.

Figure 2:
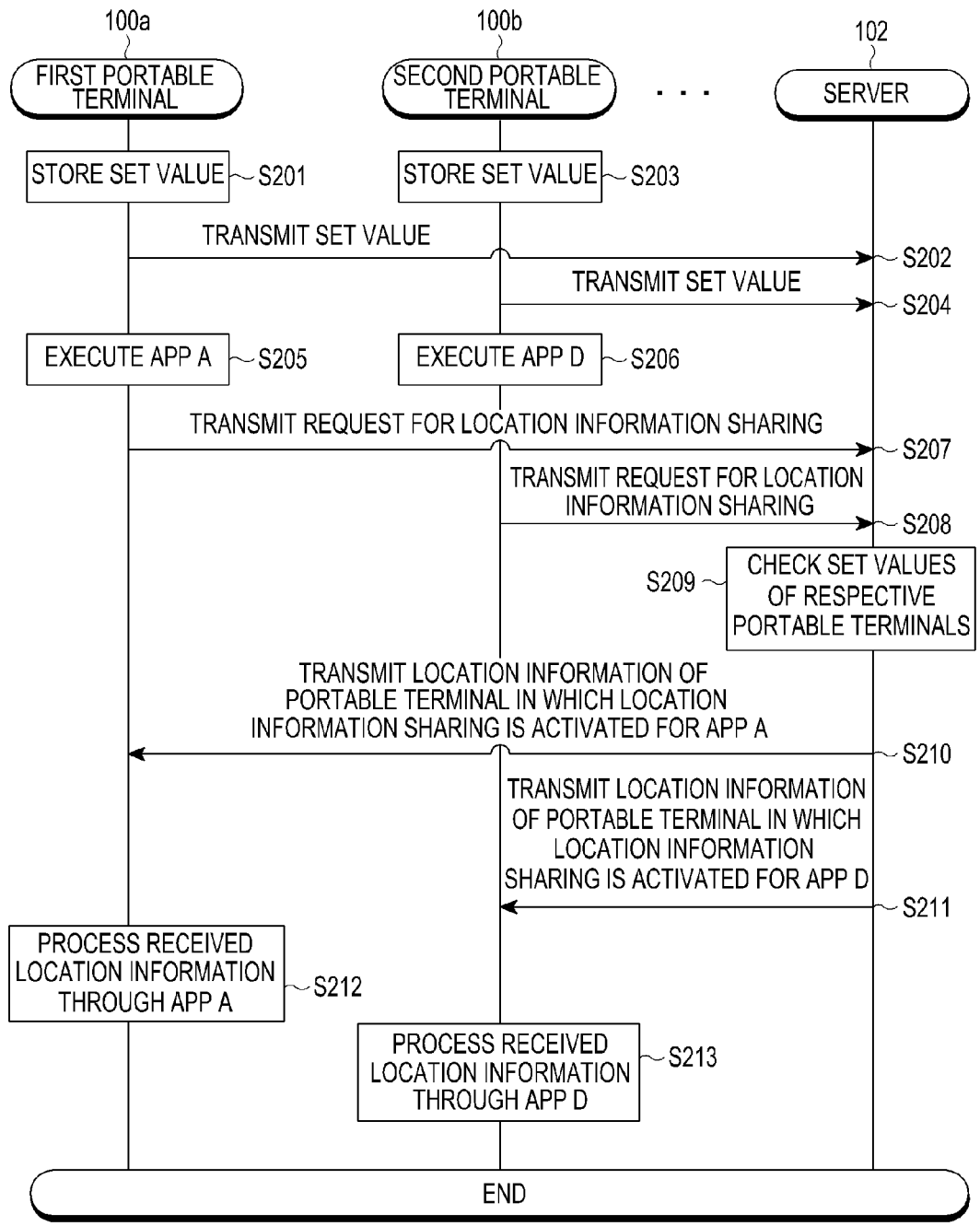
FIG. 2 is a flowchart illustrating a process of sharing location information, according to an embodiment of the present invention.

FIG. 2 is a flowchart illustrating a process of sharing location information, according to an embodiment of the present invention FIG. 2, illustrates operations of a first portable terminal 100a and a second portable terminal 100b. While only the first portable terminal 100a and the second portable terminal 100b are described with reference to FIG. 2, embodiments of the present invention can be carried out through any number of portable terminals.

In steps S201 and S203, each of the first portable terminal 100a and the second portable terminal 100b stores a set value related to location-information sharing. In steps S202 and S204, the first portable terminal 100a and the second portable terminal 100b transmit the stored set value to a server 102.

The set values transmitted to the server 102 may be understood with reference to FIG. 3, which illustrates first through fourth set values 310 through 340, according to an embodiment of the present invention.

A first set value 310 corresponds to setting in which a user of the first portable terminal 100a activates location-information sharing for applications A and D and deactivates location-information sharing for applications B and C.

A second set value 320 corresponds to setting in which a user of the second portable terminal 100b deactivates location-information sharing for the applications A, B, and C, and activates location-information sharing for the application D.

A third set value 330 corresponds to setting in which a user of a third portable terminal 100c activates location-information sharing for the applications A and B, and deactivates location-information sharing for the applications C and D.

A fourth set value 340 corresponds to setting in which a user of a fourth portable terminal 100d activates location-information sharing for the application A, and deactivates location-information sharing for the applications B, C, and D.

As described regarding the set values 310 through 340, a first user of a portable terminal may permit a second user of another portable terminal to check the first user's location through a particular application. For example, the user of the first portable terminal 100a applies the first set value 310 as setting regarding location-information sharing, thereby permitting a users of other portable terminals to check the location information of the user of the first portable terminal 100a by using the applications A and D.

By activating or deactivating location-information sharing for each application, a user's privacy is protected, and when necessary, location information of the user can be easily determined.

When the second set value 320 of FIG. 3 is applied, for example, the user of the second portable terminal 100b deactivates location-information sharing, such that users of other portable terminals using the applications A, B, and C cannot determine the location of the user of the second portable terminal 100b, thereby protecting the user's privacy. Assuming that the application D is an application for searching for a person's location, which is used in an authorized organization (e.g., a police station), the user of the second portable terminal 100b permits the user of another portable terminal (e.g., a police officer) to check the location of the user of the second portable terminal 100b through the application D.

Figure 4:
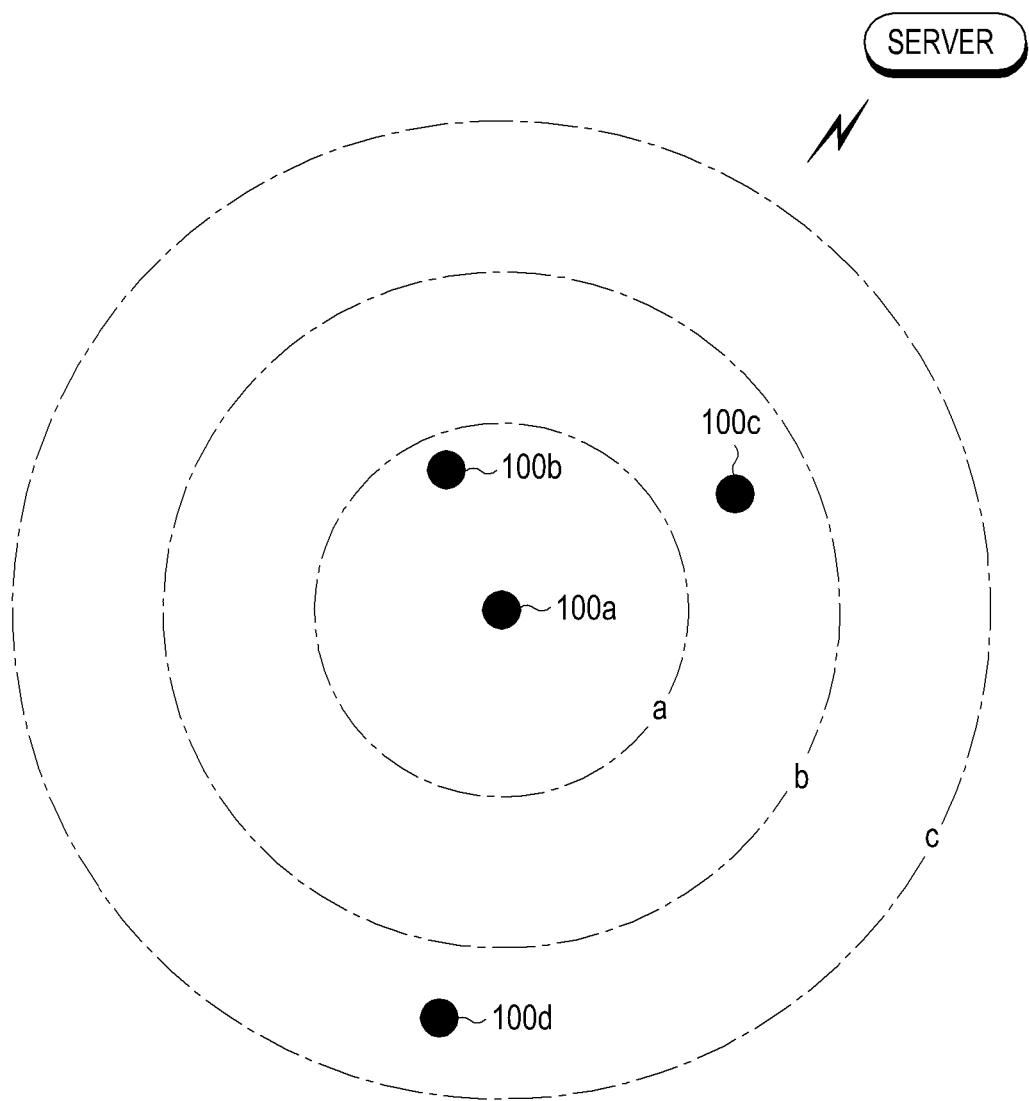
FIG. 4 is a diagram illustrating a process of sharing location information, according to an embodiment of the present invention.

When the server 102 receives the set values from the respective portable terminals (e.g., the portable terminals 100a, 100b, 100c, and 100d shown in FIG. 4), the server 102 stores the received set values in a separate database.

Referring again to FIG. 2, in steps S205 and S206, a controller of the first portable terminal 100a and a controller of the second portable terminal 100b each execute a predetermined application that uses location information at the request of the user. In steps S207 and S208, the first portable terminal 100a and the second portable terminal 100b send a request for sharing location information to the server 102.

The user of the first portable terminal 100a activates location-information sharing for the application A as indicated in the first set value 310 of FIG. 3, executes the application A, and requests sharing of location information to determine location information of another portable terminal during use of the application A.

The user of the second portable terminal 100b activates location-information sharing for the application D as indicated in the second set value 320 of FIG. 3, executes the application D, and requests sharing of location information to determine location information of another portable terminal.

Users of the third portable terminal 100c and the fourth portable terminal 100d may also request sharing of location information after execution of a predetermined application.

Thus, if sharing of location information is requested by the user, the controller of the portable terminal transmits predetermined data to the server 102 to request sharing of location information from the server 102.

When transmitting the data related to the request for sharing of location information to the server 102, the controller may also transmit location information of the requesting portable terminal (e.g., the current location of the requesting portable terminal) to the server 102. The controller of the requesting portable terminal may also transmit identification information of an application related to the request for sharing of location information to the server 102.

For example, if sharing of location information is requested by the user after execution of the application A, the controller of the first portable terminal may transmit the location information of the first portable terminal, the identification information of the application A, and the data related to the request for sharing of location information to the server 102. The server 102 may confirm that sharing of location information is requested, check the location of the portable terminal that requested sharing of location information, and check a type of the application that was executed and will use the location information.

In step S209, the server 102 checks the set values acquired from the respective portable terminals. In step S210, the server 102 transmits location information of a portable terminal for which location-information sharing is activated for the application in which sharing of location information is requested by the first portable terminal 100a, to the first portable terminal 100a. In step S211, the server 102 transmits location information of a portable terminal for which location-information sharing is activated for an application in which sharing of location information is requested by the second portable terminal 100b, to the second portable terminal 100b.

Referring to FIG. 3, the user of the first portable terminal 100a, which corresponds to the first set value 310, requests sharing of location information after execution of the application A. The user of the second portable terminal 100b, which corresponds to the second set value 320, requests sharing of location information for the application D. The user of the third portable terminal 100c, which corresponds to the third set value 330, requests sharing of location information for the applications A and B. The user of the fourth portable terminal 100d, which corresponds to the fourth set value 340, requests sharing of location information for the applications B and C.

Therefore, the server 102 checks the set values for the respective portable terminals that are stored in the predetermined database, and recognizes that in response to the request for sharing of location information from the first portable terminal 100a in association with the application A, only location information of the third portable terminal 100c is provided. Thus, the server 102 acquires the location information of the third portable terminal 100c from the third portable terminal 100c (or a separate server), and transmits the location information of the third portable terminal 100c to the first portable terminal 100a.

Likewise, the server 102 recognizes that in response to the request for sharing of location information from the second portable terminal 100b in association with the application D, only location information of the first portable terminal 100a and the fourth portable terminal 100d are provided. The server 102 then transmits the location information of the first portable terminal 100a and the location information of the fourth portable terminal 100d to the second portable terminal 100b.

When the third portable terminal 100c requests sharing of location information after execution of the application B, the server 102 transmits the location information of the fourth portable terminal 100d to the third portable terminal 100c.

If the fourth portable terminal 100d requests sharing of location information after execution of the application C, the server 102 may recognize that there is no portable terminal in which location-information sharing is activated for the application C, and may notify so to the fourth portable terminal 100d. When receiving data indicating that there is no portable terminal in which location-information sharing is activated for the application C, the controller of the fourth portable terminal 100d notifies the user through, for example, audible information, visual information, and/or vibration information.

Referring back to FIG. 2, in steps S212 and S213, the controllers of the first and second portable terminals 100a and 100b process the location information of another portable terminal, which has been received in response to the request for sharing of location information, through the corresponding application.

Referring to FIG. 4, the controller of the first portable terminal 100a, after requesting sharing of location-information for the application A, receives the location information of the third portable terminal 100c, which has transmitted the third set value 330 (in which location-information sharing has been activated for the application A), and processes the location information of the third portable terminal (e.g., displays the location information on a map or screen) through the application A.

Similarly, the controller of the second portable terminal 100b, after requesting sharing of location information for the application D, receives the location information of the first portable terminal 100a, which has transmitted the first set value 310, and the location information of the fourth portable terminal 100d, which has transmitted the fourth set value 340, from the server 102. Thereafter, the controller of the second portable terminal 100b processes the location of the first portable terminal 100a and the location of the fourth portable terminal 100d through the application D.

Although it has been described that once sharing of location information is requested from a portable terminal, the server 102 checks all set values of respective portable terminals, which are stored in the database, such configuration may be changed in additional embodiments of the present invention.

Specifically, when requesting sharing of location information after execution of an application using location information, a portable terminal may transmit information (e.g., a phone number) regarding a particular portable terminal whose location information is desired. The server 102 may check only a set value of the particular portable terminal indicated by the phone number, and then transmit location information of only the particular portable terminal to the requesting portable terminal.

For example, the first portable terminal 100a may also transmit information identifying the third portable terminal 100c (e.g., a phone number of the third portable terminal) when transmitting a request for sharing of location information to the server 102 after execution of the application A. Thus, the server 102 rapidly checks the set value of only the third portable terminal 100c, such that the server 102 recognizes that location-information sharing of the third portable terminal 100c has been activated for the application A, and transmits the location information of the third portable terminal 100c to the first portable terminal 100a.

While it has been described that location-information sharing is requested after execution of an application using location information, execution of the application does not have to precede the requesting of the sharing of location-information because execution of the application needs some amount of execution time.

Therefore, an embodiment of the present invention in which sharing of location-information is requested after execution of the application in steps S205 through S208 of FIG. 2 may be implemented by setting a predetermined menu or inputting a predetermined key for requesting sharing of location-information sharing (as long as location-information sharing can be rapidly requested).

By setting whether to share location information application-by-application, the location information can be used usefully and variously.

Software components including instructions or code for performing the methodologies described herein may be stored in one or more of associated memory devices (e.g., Read Only Memory (ROM), fixed or removable memory) and, when ready to be utilized, loaded in part or in whole (e.g., into Random Access memory (RAM)) and executed by a Central Processing Unit (CPU).

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method performed by a first portable terminal for sharing and using location information, the method comprising the steps of:
    displaying a list including a plurality of applications that use location information from among a plurality of applications stored in the first portable terminal, on a screen of the first portable terminal;
    receiving, for each of the plurality of applications, which use location information, included in the list, a corresponding setting indicating whether location-information sharing is activated through the screen;
    storing each of the settings in set information corresponding to each of the plurality of applications;
    transmitting identification information corresponding to each of the plurality of applications and the set information corresponding to each of the plurality of applications to a server;
    executing an application for which the location-information sharing is activated;
    transmitting, to the server, identification information of the executed application and a request for sharing of location information with respect to the executed application;
    receiving, from the server, location information of a second portable terminal in which the location-information sharing is activated for the executed application; and
    processing the received location information of the second portable terminal through the executed application.

2. The method of claim 1, wherein transmitting the request comprises transmitting, to the server, information identifying the second portable terminal whose location information is desired with the request for sharing of location information.

3. The method of claim 2, wherein receiving the location information comprises receiving, from the server, the location information of the second portable terminal, when the location-information sharing is activated for the executed application in the second portable terminal.

4. The method of claim 1, further comprising, when an application from among the plurality of applications is deleted from the first portable terminal, updating the set information by deleting a setting that corresponds to the deleted application.

5. The method of claim 4, further comprising transmitting the updated set information to the server within a predetermined time of the set information being updated.

6. The method of claim 1, further comprising receiving, from the server, a notification indicating that there is no portable terminal in which the location-information sharing is activated for the executed application.

7. The method of claim 1, further comprising transmitting a current location of the first portable terminal to the server.

8. A system for sharing and using location information, the system comprising:
    a first portable terminal configured to:
    display a list including a plurality of applications that use location information from among a plurality of applications stored in the first portable terminal, on a screen of the first portable terminal,
    receive, for each of the plurality of applications, which use location information, included in the list, a corresponding setting indicating whether location-information sharing is activated through the screen,
    store each of the settings in set information corresponding to each of the plurality of applications,
    transmit identification information corresponding to each of the plurality of applications and the set information corresponding to each of the plurality of applications to a server,
    execute an application for which the location-information sharing is activated, and
    transmit, to the server, identification information of the executed application and a request for sharing of location information with respect to the executed application; and the server configured to
    receive the identification information of the executed application and the request for sharing of location information with respect to the executed application, and
    transmit, to the first portable terminal, location information of a second portable terminal in which the location-information sharing is activated for the executed application.

9. The system of claim 8, wherein the first portable terminal is further configured to transmit, to the server, information identifying the second portable terminal whose location information is desired with the request for sharing of location information.

10. The system of claim 9, wherein the server is further configured to:
    determine whether the location-information sharing is activated for the executed application by checking set information of the second portable terminal, and
    transmit the location information of the second portable terminal to the first portable terminal, when the location-information sharing is activated for the executed application in the second portable terminal.

11. The system of claim 8, wherein the first portable terminal is further configured to:
    receive the location information of the second portable terminal from the server, and
    process the location information through the executed application.

12. The system of claim 8, wherein the first portable terminal is further configured to, when an application from among the plurality of applications is deleted from the first portable terminal, to update the set information by deleting a setting that corresponds to the deleted application, and transmit the updated set information to the server within a predetermined time of the set information being updated.

13. The system of claim 8, wherein the server is further configured to transmit, to the first portable terminal, a notification indicating that there is no portable terminal in which the location-information sharing is activated for the executed application.

14. The system of claim 8, wherein the portable terminal is further configured to transmit a current location of the first portable terminal to the server.

15. A first portable terminal for sharing and using location information, the first portable terminal comprising:
- a display unit configured to display a list including a plurality of applications that use location information from among a plurality of applications stored in the first portable terminal, on a screen of the first portable terminal;
- an input unit configured to receive, for each of the plurality of applications, which use location information, included in the list, a corresponding setting indicating whether location-information sharing is activated through the screen;
- a memory configured to store each of the settings in set information corresponding to each of the plurality of applications;
- a transceiver configured to transmit, to a server, identification information corresponding to each of the plurality of applications and the set information corresponding to each of the plurality of applications, and identification information of an executed application and a request for sharing of location information with respect to the executed application in which the location-information sharing is activated, and to receive location information of a second portable terminal in which the location-information is activated for the executed application; and
- a controller configured to execute the application, and to process the received location information through the executed application.

16. An article of manufacture for sharing and using location information by a first portable terminal, comprising a non-transitory machine readable medium containing one or more programs which when executed by the first portable terminal implement the steps of:
- displaying a list including a plurality of applications that use location information from among a plurality of applications stored in the first portable terminal, on a screen of the first portable terminal;
- receiving, for each of the plurality of applications, which use location information, included in the list, a corresponding setting indicating whether location-information sharing is activated through the screen;
- storing each of the settings in set information corresponding to each of the plurality of applications;
- transmitting identification information corresponding to each of the plurality of applications and the set information corresponding to each of the plurality of applications to a server;
- executing an application for which the location-information sharing is activated;
- transmitting, to the server, identification information of the executed application and a request for sharing of location information with respect to the executed application;
- receiving, from the server, location information of a second portable terminal in which the location-information sharing is activated for the executed application; and
- processing the received location information of the second portable terminal through the executed application.

* * * * *